United States Patent
Medeiros et al.

(10) Patent No.: US 10,851,214 B2
(45) Date of Patent: Dec. 1, 2020

(54) POLYMER GELS, METHOD OF PREPARATION AND USES THEREOF

(71) Applicant: Rhodia Acetow GmbH, Freiburg (DE)

(72) Inventors: Guainumbi Medeiros, Campinas (BR); Renata Brito, Campinas (BR)

(73) Assignee: Rhodia Acetow GmbH, Freiburg (DE)

( * ) Notice: Subject to any disclaimer, the term of this patent is extended or adjusted under 35 U.S.C. 154(b) by 0 days.

(21) Appl. No.: 15/760,776

(22) PCT Filed: Sep. 8, 2016

(86) PCT No.: PCT/EP2016/071189
§ 371 (c)(1),
(2) Date: Mar. 16, 2018

(87) PCT Pub. No.: WO2017/045994
PCT Pub. Date: Mar. 23, 2017

(65) Prior Publication Data
US 2018/0273697 A1    Sep. 27, 2018

(30) Foreign Application Priority Data
Sep. 17, 2015   (EP) .................................... 15185595

(51) Int. Cl.
*C08J 3/075*   (2006.01)

(52) U.S. Cl.
CPC ........... *C08J 3/075* (2013.01); *C08J 2301/02* (2013.01); *C08J 2301/10* (2013.01); *C08J 2301/12* (2013.01)

(58) Field of Classification Search
None
See application file for complete search history.

(56) References Cited

U.S. PATENT DOCUMENTS

| | | |
|---|---|---|
| 4,859,758 A | 8/1989 | Shalati et al. |
| 5,086,144 A | 2/1992 | Shalati et al. |
| 2009/0306290 A1* | 12/2009 | Bucevschi ............... A61L 15/60 525/54.1 |
| 2014/0097375 A1* | 4/2014 | Ho ..................... C08G 73/1039 252/62.2 |

FOREIGN PATENT DOCUMENTS

| | | | |
|---|---|---|---|
| JP | 2010-535911 A | 11/2010 | |
| JP | 2012012462 A | * 1/2012 | ................ C08J 3/24 |
| WO | 2009/021701 A2 | 2/2009 | |
| WO | 2011/154759 A1 | 12/2011 | |

OTHER PUBLICATIONS

Senna, A. M., Novack, K. M., & Botaro, V. R. (2014). Synthesis and characterization of hydrogels from cellulose acetate by esterification crosslinking with EDTA dianhydride. Carbohydrate polymers, 114, 260-268. (Year: 2014).*
Office Action issued in Japanese Patent Application No. 2018-514422, dated May 21, 2019.
International Search Report issued in Application No. PCT/EP2016/071189, dated Nov. 28, 2016.
Chen Zhuang et al.: "Anti-degradation gelatin films crosslinked by active ester based on cellulose," RSC Advances: An International Journal to Further the Chemical Sciences, vol. 5, No. 64, XP055260398, GB ISSN: 2046-2069, DOI: 10.1039/C5RA04808G, pp. 52183-52188, Jan. 1, 2015.
Brazilian Patent Office Search Report for Application No. BR112018003555-6 dated Feb. 18, 2020 (4 pages).
English translation of Chinese Office Action for Application No. 201680053712.7 dated Jun. 1, 2020 (9 pages).

* cited by examiner

*Primary Examiner* — Dale R Miller
(74) *Attorney, Agent, or Firm* — Michael Best & Friedrich LLP

(57) ABSTRACT

The invention relates to a method for the preparation of a polymer gel, comprising cross-linking a polymer by using a cyclic dianhydride of carboxylic acid as cross-linking agent and treating the polymer gel with bicarbonate. The invention further concerns the polymer gel obtainable by the method of the invention and the uses thereof in various applications.

8 Claims, No Drawings

POLYMER GELS, METHOD OF PREPARATION AND USES THEREOF

BACKGROUND OF THE INVENTION

The present invention relates to polymer gels and a method of preparation thereof. Polymer gels are cross-linked polymers which are capable of absorbing high amounts of liquid, for example water. In particular, cross-linked polymer hydrogels capable of absorbing an amount of water in excess of 10 times their dry weight are defined as "superabsorbent". The cross-links or cross-linking knots, i.e. the physical or chemical bonds between the macromolecular chains forming the polymer gel network, guarantee the structural integrity of the polymer-liquid system, on the one hand preventing the complete solubilization of the polymer, and on the other hand allowing the retention of the liquid phase within the molecular mesh.

The polymer gels which are currently available on the market are characterized not only by their marked absorbent properties, but also by their biocompatibility, which is probably due to the high water content, and, above all, by the possibility of adjusting their absorption properties according to the external stimuli. Consequently, such polymer hydrogels may be used as intelligent materials, for example for the manufacture of sensors or actuators for a number of industrial applications. Besides the usual applications as absorbent cores in the field of personal hygiene absorbent products, there are more recent and innovative applications such as for example in the biomedical field, for the development of controlled release drug formulations, artificial muscles, sensors, etc., and in agriculture and horticulture, for example in devices for the controlled release of water and nutrients in arid soils.

However, the polymer gels currently available are almost exclusively acrylic-based products, and hence not biodegradable.

Given the growing interest in environmental protection issues, over recent years a vast amount of interest has been focused on the development of superabsorbent materials based on biodegradable polymers, having properties which are similar to those of the traditional superabsorbent polyacrylics.

Examples of biodegradable polymers used to obtain superabsorbent polymer gels are starch and cellulose derivatives.

In 1990 Anbergen U and Oppermann W, Polymer, 31, 1854, proposed a method for the synthesis of a superabsorbent material made entirely from cellulose derivatives. In particular, they used hydroxyethylcellulose (HEC) and a carboxymethylcellulose sodium salt (CMCNa), chemically cross-linked in a basic solution with divinylsulphone. However, the absorption properties of such materials are not high compared to those of the acrylic-based superabsorbent materials.

Some carbodiimides are also known amongst the unconventional cross-linking agents. Particularly, the use of carbodiimides in order to cross-link salified or non-salified carboxymethylcellulose (CMC) was described in ES 484964 and WO 2006/070337. However, during the cross-linking reaction with CMCNa, this substance turns into a slightly toxic urea derivative, which must be removed during the washing step, thereby further increasing the costs and the complexity of the production process.

More recently, US 2010/0234233 A1 has described the use of polycarboxylic acid, such as citric acid, as crosslinking agent for producing hydrogels. The polymer used in this document is a mixture of an ionic polymer and a non-ionic polymer, for example a mixture of Carboxymethylcellulose and Hydroxyethylcellulose. A molecular spacer, which is a polyhydroxylated alcohol such as sorbitol is also disclosed as useful for increasing the absorption capacity of the hydrogel. This process works with hydrophilic polymers. However, for hydrophobic polymers, like cellulose acetate, the swelling ratio obtained through this process is not satisfactory.

SUMMARY OF THE INVENTION

The object of the present invention is to provide new polymer gels which overcome the above-mentioned disadvantages and which are also a biodegradable, environment friendly and with high swelling performances.

These and other objects are achieved by the polymer gels of the invention and the method of preparation thereof as defined herein. The polymer gels of the invention are obtained by a crosslinking reaction with a cyclic dianhydride and a treatment with a solution of bicarbonate. Advantageously, before crosslinking, a reaction of the polymer with a cyclic monoanhydride acting as a polar molecular spacer is performed.

The invention relates, in part, to the discovery that the cross-linking of cellulose derivatives which are previously reacted with a specific monoanhydride, with particular dianhydrides, such as pyromellitic dianhydride results in the formation of polymer gels with a great liquid absorption performance. Although pyromellitic dianhydride has been reported as a cross-linking agent for polymers such as cellulose derivatives in US 2010/0234233 A1 and the article of Quim. Nova, Vol. 36, No. 1, 02-106, 2013, its combination with a post treatment with a solution of bicarbonate has not been previously disclosed. Also, its combination with a polymer previously reacted with a cyclic monoanhydride, has never been disclosed.

In this context, the method for preparing a polymer gel according to the present invention comprises the step of:
  (a) Adding a cyclic dianhydride to a solution comprising a polymer in the presence of a catalyst and,
  (b) Maintaining the solution of step (a) under conditions suitable for cross-linking of the hydrophilic polymer by the cyclic dianhydride; thereby forming a polymer gel.
  (c) Treating the polymer gel with an aqueous solution of bicarbonate.

In yet another embodiment, the present invention provides polymer gels, which can be prepared using the method of the invention.

Such polymer gels comprise a polymer matrix comprising polymeric chains wearing hydroxyl pending groups, a first portion of said hydroxyl pending groups being substituted by a divalent hydrocarbon group (coming from the cyclic dianhydride) crosslinking the polymeric chains to one another and wearing a polar function COOH and/or a salt thereof. Advantageously, a second portion of said hydroxyl pending groups is substituted by a monovalent hydrocarbon group (coming from the cyclic monoanhydride), said monovalent hydrocarbon group wearing a polar function COOH and/or a salt thereof.

By a "first portion", it is understood that this portion represents from 10 to 70% of the total number of free OH group of pending hydroxyl groups in the polymer.

By a "second portion", it is understood that this portion can represent from 10 to 70% of the total number of free OH group of pending hydroxyl groups in the polymer before reaction with the monoanhydride.

Further, the invention includes articles of manufacture which comprise such polymer gels.

Definitions

The term "biosourced" means that it is a material derived from renewable resources. A renewable resource is a natural, animal or plant resource, whose stock 10 can be reconstituted over a short period on a human timescale. It is in particular necessary for this stock to be able to be renewed as quickly as it is consumed.

Unlike materials derived from fossil materials, renewable starting materials contain a large proportion of $^{14}C$. This characteristic may especially be determined via 15 one of the methods described in standard ASTM D6866, especially according to the mass spectrometry method or the liquid scintillation spectrometry method.

These renewable resources are generally produced from cultivated or non-cultivated vegetable matter such as trees, plants such as sugarcane, corn, cassava, 20 wheat, rapeseed, sunflower, palm, castor-oil plant or the like, or from animal matter such as fats (tallow, etc.).

The terms "anhydride", "monoanhydride" and "dianhydride" in this text mean "carboxylic acid anhydride", "carboxylic acid monoanhydride" and "carboxylic acid dianhydride".

The term "a" is a generic plural and should be understood as "one or more", except explicit mention of the contrary.

As used herein, the term "polymer" can refer to a homopolymer, which includes only one repeating unit, or a copolymer, comprising two or more different repeating units.

DETAILED DESCRIPTION OF THE INVENTION

The present invention provides polymer gels, methods for preparing the polymer gels, methods of use of the polymer gels and articles of manufacture comprising the polymer gels.

The method for preparing a polymer gel of the present invention comprises the steps of:
(a) Adding a cyclic dianhydride to a solution comprising a polymer in the presence of a catalyst and,
(b) Maintaining the solution of step (a) under conditions suitable for cross-linking of the hydrophilic polymer by the cyclic dianhydride; thereby forming a polymer gel.
(c) Treating the polymer gel with an aqueous solution of bicarbonate.

Advantageously, the method of the invention further comprises, before step (a), the step of: (a0) Adding a cyclic monoanhydride to a solution comprising a polymer comprising hydroxyl groups, in the presence of a catalyst.

Polymer and Solution Containing it

In the method according to the invention, the polymer is advantageously selected from the group consisting of polysaccharides and derivatives thereof.

Examples of suitable polysaccharides include cellulose, hemicellulose, substituted celluloses, substituted dextrans, substituted starches, glycosaminoglycans and polyuronic acids, alginates and mixtures thereof.

Polysaccharides which can be used are selected from the group consisting of methylcellulose, ethylcellulose, n-propylcellulose, hydroxymethylcellulose, hydroxy-n-propylcellulose, hydroxy-n-butylcellulose, hydroxypropylmethylcellulose, ethylhydroxyethylcellulose, cellulose, hemicellulose, cellulose acetate (mono, di or tri or a mixture thereof), cellulose propionate (mono, di or tri or mixtures thereof), carboxymethylcellulose, carboxymethylstarch, dextran sulfate, dextran phosphate, diethylaminodextran, heparin, hyaluronan, chondroitin, chondroitin sulfate, heparan sulfate, polyglucuronic acid, polymanuronic acid, polygalacturonic acid, polyarabinic acid and mixtures thereof.

In a preferred embodiment, the polymer is chosen in the list of cellulose, hemicellulose, cellulose acetate (mono, di or tri or a mixture thereof), cellulose propionate (mono, di or tri or mixtures thereof), carboxymethylcellulose and mixtures thereof. If cellulose triacetate is used, it is in a mixture with cellulose mono and/or di acetate.

Advantageously, the polymer is a cellulose acetate with a degree of substitution of OH groups comprised between 1 and 3, preferably between 1.3 and 3, and even more preferably between 2.2 and 2.7.

In a particular embodiment, the polymer is a biosourced according to standard ASTM D6866 described above.

In the method of the invention, the solution comprising the polymer is advantageously an organic solvent-based solution, the organic-based solvent being chosen in the list: acetone, dimethylsulfoxide, aniline, benzyl alcohol, cyclohexanone, diethanolamine, N,N-dimethylacetamide, dimethylformamide, 1,5-dimethyl-2-pyrrolidone, 1,4-dioxane, ethylene glycol ether, ethyl acetate, hexafluoroisopropanol, methyl acetate, n-methylpyrrolidone-2, naphthol, pyridine, tetrafluoro-n-propanol, tetrafluoroisopropanol, trifluoroethanol and mixtures thereof. Preferably acetone is chosen.

As preferred embodiment, the polymer is present in a concentration from about 2% to 30% by weight of the total weight of the solution before the addition of the cyclic dianhydride (or before the addition of cyclic monoanhydride when it is the case), preferably from about 8% to 20% by weight.

Cyclic Dianhydride

The cyclic dianhydride of the invention can be selected from the group consisting of pyromellitic dianhydride (PMDA), ethylenediaminetetraacetic dianhydride (EDTA), diethylenetriaminepentaacetic dianhydride (DTPA), 3,3',4,4'-bisphenyltetracarboxylic dianhydride (BPDA), pyromelitic diimide (PyDi), benzophenone-3,3',4,4'-tetracarboxylicdianhydride and mixtures thereof.

Pyromellitic dianhydride (PDMA) is preferred.

The dianhydride is advantageously solubilized in an organic solvent-based solution, the organic-based solvent being chosen in the list: acetone, dimethylsulfoxide, aniline, benzyl alcohol, cyclohexanone, diethanolamine, N,N-dimethylacetamide, dimethylformamide, 1,5-dimethyl-2-pyrrolidone, 1,4-dioxane, ethylene glycol ether, ethyl acetate, hexafluoroisopropanol, methyl acetate, n-methylpyrrolidone-2, naphthol, pyridine, tetrafluoro-n-propanol, tetrafluoroisopropanol, trifluoroethanol and mixtures thereof. Preferably acetone is chosen.

Cyclic Monoanhydride

The method according to the invention can use a cyclic monoanhydride which can be selected from the group consisting of cyclic aliphatic anhydrides such as maleic and succinic anhydrides, or aromatic anhydrides such as phthalic anhydride and 1,2,4-benzenetricarboxylic anhydride and mixtures thereof. Preferably, the cyclic monoanhydride is phthalic anhydride.

The reaction of cyclic monoanhydride allows the final polymer gel to have an increased absorption capacity. The cyclic monoanhydride acts as a polar molecular spacer by both sterically blocking access to the polymer chains, thereby increasing the average distance between the polymer chains and attracting the polar molecules like water. Crosslinking, therefore, can occur either at sites which are not close together or not systematically on all OH positions, thereby enhancing the ability of the polymer network to expand so as to greatly increase the polymer hydrogel absorption properties.

The best results in terms of swelling properties is obtained when the monoanhydride is phthalic anhydride and the dianhydride is pyromellitic dianhydride (PDMA).

Conditions

Concentrations

In the method of the invention, in the solution of step (a0), an accurate molar ratio of monoanhydride per hydroxyl group of the polymer is about from 0.1 to 1 mol/mol, preferably from 0.25 to 1 mol/mol, more preferably from 0.5 to 1 mol/mol and notably 0.75 mol/mol.

Also, in the solution of step (a), the molar ratio of dianhydride per hydroxyl group of the polymer is preferably about from 0.1 to 2 mol/mol, preferably from 0.5 to 1.5 mol/mol, more preferably from 0.75 to 1.25 mol/mol and notably 1 mol/mol.

These molar ratios are calculated on content of hydroxyl group of the polymer before reaction with the cyclic dianhydride when no monoanhydride is used, or before reaction with the cyclic monoanhydride when a cyclic monoanhydride is used.

The best results are obtained when in the solution of step (a0), the molar ratio of monoanhydride per hydroxyl group of the polymer is about from 0.5 to 1 mol/mol and in the solution of step (a), the molar ratio of dianhydride per hydroxyl group of the polymer is preferably about from 0.75 to 1.25 mol/mol. Even more preferably, in the solution of step (a0), the molar ratio of monoanhydride per hydroxyl group of the polymer is 0.75 mol/mol and in the solution of step (a), the molar ratio of dianhydride per hydroxyl group of the polymer is 1 mol/mol Temperature, Pressure In a particular embodiment of the method according to the invention, before step (a0) the polymer is solubilized into an organic-based solvent at a temperature of about 10 to 150° C., preferably 10 to 50° C., more preferably 15 to 30° C. and even more preferably at room temperature. Pressure should be kept above vapor pressure of the system. The pressure in this step of solubilization is advantageously atmospheric pressure even if the pressure can be chosen between 0.5 and 1.5 bars.

Advantageously, during step (a0) the solution is maintained at a temperature of from about 30 to 90° C., preferably from about 50 to 80° C., and even more preferably from about 50-60° C. The pressure in step (a0) is advantageously atmospheric pressure even if the pressure can be chosen between 0.5 and 1.5 bars.

The temperature above and the reaction time are controlled to allow a sufficient number of OH functions of the polymer to react with the monoanhydride. The reaction time is generally between 1 and 6 hours.

This step (a0) aims at obtaining a partially OH-substituted polymer, the portion of free OH groups that are preferably substituted by the monoanhydride is from 10% to 70% of the total number of free OH groups of the polymer before addition of the monoanhydride.

Then, during step (a) the solution is preferably maintained at a temperature of from about 10 to 90° C., preferably from about 15 to 50° C., and even more preferably at room temperature. The pressure in step (a) is advantageously atmospheric pressure even if the pressure can be chosen between 0.5 and 1.5 bars.

The addition of the dianhydride in step (a) can be very quick, generally below 10 min.

In an embodiment of the method of the invention, during step (b) the solution is maintained at a temperature of from about 10 to 50° C., preferably from about 15 to 40° C., and even more preferably at room temperature. The temperature of step (b) should not be above the boiling point of the solvent used to solubilize the polymer and/or the dianhydride. The crosslinking reaction is generally stopped when the gel is formed, which can correspond to an reaction time in steps (c) plus (b) of less than 24 h, notably less than 3 h and even more preferably less than 30 min.

In the method of the invention, the catalyst in step (a) and/or in step (a0) is preferably a basic catalyst, advantageously selected from the group consisting of pyridine, triethylamine, DMAP (di-methylaminepyridine) and mixtures thereof.

Further Steps

The method can include further steps of purifying the polymer gel, for example, between step (b) and step (c), a step (b1) of washing the polymer gel with water, a polar organic solvent or a combination thereof, such as methanol or ethanol, thereby producing a washed polymer gel.

The polymer gel immersed in the polar solvent swells and releases any component, such as byproducts or unreacted monoanhydride an dianhydride, that was not incorporated into the polymer network. Water is preferred as the polar solvent, distilled water is still more preferred. The volume of water required during this step to reach the maximum swelling degree of the gel, is approximately 10- to 20-fold greater than the initial volume of the gel itself. The polymer gel washing step may be repeated more than once, optionally changing the polar solvent employed. For example, the polymer gel can be washed with methanol or ethanol followed by distilled water, with these two steps optionally repeated one or more times.

The method can further comprise before step (c) and after step (b1), a step (b2) of drying the washed polymer gel.

The drying step (b2) can comprise immersing the washed polymer gel in a cellulose nonsolvent.

In this case, it is carried out by immersing the fully swollen polymer gel in a cellulose nonsolvent, a process known as phase inversion. Suitable cellulose nonsolvents include, for example, acetone and ethanol. Drying the polymer gel by phase inversion results in a final microporous structure which improves the absorption properties of the polymer gel by capillarity. Moreover, if the porosity is interconnected or open, i.e. the micropores communicate with one another, the absorption/desorption kinetics of the gel will be improved as well. When a completely or partially swollen gel is immersed into a nonsolvent, the gel undergoes phase inversion with the expulsion of water, until the gel precipitates in the form of a vitreous solid as white coloured particles. Various rinses in the nonsolvent may be necessary in order to obtain the dried gel in a short period of time. For example, when the swollen polymer gel is immersed in acetone as the non-solvent, a water/acetone mixture is formed which increases in water content as the polymer gel dries; at a certain acetone/water concentration, for example, about 55 percent in acetone, water is no longer able to exit from the polymer gel, and thus fresh acetone has to be added to the polymer gel to proceed with the drying process. The higher the acetone/water ratio during drying, the faster is the drying process. Pore dimensions are affected by the rate of the drying process and the initial dimensions of the polymer gel particles: larger particles and a faster process tend to increase the pore dimensions; pore dimensions in the microscale range are preferred, as pores in this size range exhibit a strong capillary effect, resulting in the higher sorption and water retention capacity.

The polymer gels of the invention can also be dried in step (b2) by another process, such as air drying, freeze drying or oven drying. These drying methods can be used alone, in combination, or in combination with the non-solvent drying step described above. For example, the polymer gel can be dried in a non-solvent, followed by air drying, freeze drying, oven drying, or a combination thereof to eliminate any residual traces of nonsolvent. Oven drying can be carried out at a temperature of e.g. approximately 30-45 degrees centigrade until the residual nonsolvent is completely removed. The washed and dried polymer gel can then be used as is, or can be milled to produce polymer gel particles of a desired size.

Advantageously, step (b2) is a drying step of the washed polymer gel by oven drying, preferably at a temperature of about 40° C.

Also, in the method according to the invention a step (c) of treating the polymer gel with an aqueous solution of bicarbonate such as sodium or potassium bicarbonate, is performed.

Advantageously, the aqueous solution of bicarbonate is a saturated solution of sodium or potassium bicarbonate.

The step (c) of treating the polymer with bicarbonate solution has the advantage of allowing a further polarity to the gel, enhancing surprisingly the swelling performances.

It is recommended to further include a step of: (d) drying the polymer gel of step (c), for example in an oven or by any drying method described above, preferably at a temperature of about 40° C.

Polymer Gel

By using the method of the present invention, the polymer gel obtained has a swelling ratio according to ASTM JIS K 7223—Tea bag method, of at least about 10, preferably at least about 50, and even more preferably of at least about 100.

The invention further includes articles of manufacture which comprise the polymer gels of the invention. Such articles of manufacture include articles in which polyacrylic polymer hydrogels are conventionally used, in consumer products, such as for example absorbent products for personal care (i.e., babies' napkins, sanitary towels, etc.) and in products for agriculture (e.g., devices for the controlled release of water and nutrients). The polymer hydrogels obtainable by the method of the present invention therefore possess mechanical properties which make them suitable for use in all of the above-mentioned fields. Thus, the scope of the present invention also includes the use of the polymer gels obtainable by the method of the invention as an absorbent material in products which are capable of absorbing water and/or aqueous solutions and/or which are capable of swelling when brought into contact with water and/or an aqueous solution.

The polymer gels and superabsorbent polymer gels of the present invention may be used as absorbent materials in the following fields, which are provided by way of non-limiting example:

in agricultural products (for example, in devices for the controlled release of water and/or nutrients and/or phytochemicals, particularly for cultivation in arid, deserted areas and in all cases where it is not possible to carry out frequent irrigation; such products, mixed in a dry or swollen form with the soil in the areas surrounding the plant roots, absorb water during irrigation and are capable of retaining it, releasing it slowly in certain cases, together with the nutrients and phytochemicals useful for cultivation);

in personal hygiene and household absorbent products (such as for example, as the absorbent cores in babies' napkins, sanitary towels and the like);

in the field of toys and gadgets (such as for example in products which are capable of significantly changing their size once brought into contact with water or an aqueous solution);

The above-mentioned products, containing a polymer hydrogel of the present invention as the absorbent material, also fall within the scope of the invention.

In brief, the article of manufacture of the invention is preferably selected from the group consisting of devices the controlled release of water, nutrients or phytochemicals in agriculture, devices for environmental remediation, absorbent products for personal and household hygiene, toys and devices adapted to altering their size when brought into contact with water or aqueous solutions.

The following examples are provided to further illustrate the invention and are not to be construed as limiting its scope.

EXAMPLES

The materials and processes of the present invention will be better understood in connection with the following examples, which are intended as an illustration only and not limiting of the scope of the invention. Various changes and modifications to the disclosed embodiments will be apparent to those skilled in the art and such changes and modifications including, without limitation, those relating to the chemical structures, derivatives, formulations and/or methods of the invention may be made without departing from the spirit of the invention and the scope of the appended claims.

I—Swelling Tests
ASTM Reference for Water Swelling.
Swelling Test
Tea Bag:

The swelling test was determined according Tea Bag method. For this test was weighed 200 mg of gel ($W_o$) and placed in a bag made of steel with dimensions of 60×60 mm. The bag was immersed in water at room temperature for 24 h. After this time, excess of water was removed by hanging the bang until no liquid is dropped off. The bag with the swollen gel was weighed ($W_2$) and the swelling percent (Se) was calculated by the equation:

$$Se = \frac{W_2 - W_1 - W_0}{W_0}$$

Wo—mass of dried gel
W1—mass of bag without gel
W2—mass of the bag and the swollen gel The method's precision has been determined by the article to be around ±3.5%. Reference: ASTM: Japanese Industrial Standard (JIS) K 7223—Tea bag Method

Example 1—Reaction of Cellulose Acetate (CA-DS 2.5) and Dianhydride (PMDA, EDTA, DTPA and BPDA)—without Monoanhydride 5 g of CA-DS 2.5 ($9.35×10^{-3}$ mol of free OH) were solubilized in 50 g of acetone (10% w/w) in a becker with mechanical stirring (400 rpm) during 2 h at room temperature. In a closed becker, it was added dianhydride (0.5, 1.0 or 2.0 of dianhydride:1.0 of free OH of the polymer, mol:mol) over previous solution. After solubilization of all the dianhydride, which takes about 10 minutes, triethylamine as catalyst (1.0 catalyst:1.0 dianhydride, mol:mol), was added to the previous solution at a flow rate of, approximately, 2 mL/min. The reaction was stopped when it was observed gel formation. Finally, gel was washed in water/ethanol solution 20% v/v and dried in an oven at 40° C. overnight.

Each dianhydride was solubilized in different solvents according to the below table I:

TABLE I

| Dianhydride | Solvents | % (w/w) |
|---|---|---|
| PMDA—pyromellitic dianhydride | Acetone of the reaction | without previous solubilization |
| EDTA—ethylenediaminetetraacetic dianhydride | DMSO | 4 |
| DTPA—diethylenetriaminepentaacetic dianhydride | DMF | 4 |
| BPDA—3,3',4,4'-bisphenyltetracarboxylic dianhydride | DMF | 4 |

The results of example 1 are presented in table IV below.

Example 2—Comparative—Reaction of Cellulose Acetate (CA-DS 2.5) and Monoanhydride (Phtalic Anhydride—PA)—without Dianhydride In a reactor with capacity of 250 mL, 5 g of CA-DS 2.5 ($9.35 \times 10^{-3}$ mol of free OH) was solubilized in 50 g of acetone (10% w/w) with mechanical stirring (400 rpm) along 2 h at room temperature. After that, temperature of the system was raised to 56° C.; once this temperature was reached, PA (0.25 or 0.75 of PA: 1.0 of free OH of the polymer, mol:mol) was added in the system; after solubilization (it takes about 10 min over stirring), trietylamine as a catalyst (1.0 catalyst:1.0 monoanhydride, mol:mol) was added. After 4 h of reaction, the system was cooled until room temperature and precipitation of product was done with water. Finally, the product was washed in water/ethanol solution (20% v/v) and dried in an oven at 40° C. overnight.

Table of Results:

Reaction with just monoanhydride:

TABLE II

| Mono-anhydride (PA) | Di-anhydride | Swelling | |
|---|---|---|---|
| | | Without NaHCO$_3$ | Treatment with NaHCO$_3$ |
| 0.25 | 0 | 1 | 34 |
| 0.75 | 0 | 3 | 46 |
| 1.0 | 0 | 6 | 15 |

The product without dianhydride has a fibrous appearance, and it does not form a gel in water. The appearance is similar to "cotton", it absorbs water but continue in a fibrous form.

In this case without dianhydride the chains have more mobility because don't have crosslinkages.

Example 3

3.1—Reaction of Cellulose Acetate (CA-DS 2.5) and Monoanhydride (Phtalic Anhydride—PA)

In a reactor with capacity of 250 mL, 5 g of CA-DS 2.5 ($9.35 \times 10^{-3}$ mol of free OH) was solubilized in 50 g of acetone (10% w/w) with mechanical stirring (400 rpm) along 2 h at room temperature. After that, temperature of the system was raised to 56° C.; once this temperature was reached, PA (0.25 or 0.75 of PA: 1.0 of free OH of the polymer, mol:mol) was added in the system; after solubilization (it takes about 10 min over stirring), trietylamine as a catalyst (1.0 catalyst:1.0 monoanhydride, mol:mol) was added. The reaction is run during 4 h.

3.2—Reaction of the Product Obtained at 3.1 with Dianhydride

After reaction of cellulose acetate (CA) with monoanhydride (as described in part 3.1), it was added dianhydride (0.5, 1.0 or 2.0 of dianhydride of table 111:1.0 free OH of the initial polymer before reaction with monoanhydride, mol:mol) previously solubilized in the various solvents indicated below in table III. After homogenization, triethylamine as catalyst (1.0 of catalyst:1.0 dianhydride, mol:mol), was added. The reaction stopped when it was observed an increase in viscosity at reaction system (gel formation). Finally, gel was washed in water/ethanol solution 20% v/v and dried in an oven at 40° C. overnight.

Each dianhydride was solubilized in different solvents according to the below table III:

TABLE III

| Dianhydride | Solvents | % (w/w) |
|---|---|---|
| PMDA | Acetone | 4 |
| EDTA | DMSO | 4 |
| DTPA | DMF | 4 |
| BPDA | DMF | 4 |

3.3—Purification STEP

After synthesis of the gels, it was performed purification, at which gel was added in water/ethanol solution (20% w/w). Duration of this step is approximately 30 days or until it was not observed unreacted reagents (aromatic components were monitored (dianhydrides, monoanhydrides) by the UV-vis spectrophotometry). During this time water/ethanol solution was changed every two days.

3.4—Insertion Osmosis Process—Treatment of the Gel with Sodium Bicarbonate Saturated Solution (NaHCO3)

First, it was prepared a saturated solution of sodium bicarbonate (NaHCO$_3$). In a Becker containing 100 mL of sodium bicarbonate solution, it was added 1 g of dried gel. This solution was mixed for 24 h at room temperature. After this time, gel was filtered and dried in oven at 40° C. overnight.

Table of Results:

TABLE IV

| | Mono-anhydride (PA) | Di-anhydride | Swelling | |
|---|---|---|---|---|
| | | | Without NaHCO$_3$ | Treatment with NaHCO$_3$ |
| PMDA | 0 | 0.5 | <1 | 8 |
| | 0 | 1 | <1 | 20 |
| | 0.25 | 0.5 | <1 | 15 |
| | 0.25* | 1* | <1 | 72* |

TABLE IV-continued

| | Mono-anhydride (PA) | Di-anhydride | Swelling Without NaHCO$_3$ | Swelling Treatment with NaHCO$_3$ |
|---|---|---|---|---|
| | 0.75 | 0.5 | <1 | 35 |
| | 0.75 | 1 | <1 | 109 |
| | 1 | 1 | <1 | 76 |
| EDTA | 0 | 0.5 | <1 | 1 |
| | 0 | 1 | <1 | 4 |
| | 0.25 | 0.5 | <1 | 10 |
| | 0.25 | 1 | <1 | 53 |
| | 0.75 | 0.5 | <1 | 35 |
| | 0.75 | 1 | <1 | 77 |
| DTPA | 0 | 0.5 | 4 | 6 |
| | 0 | 1 | <1 | 19 |
| | 0.25 | 1 | <1 | 25 |
| BPDA | 0 | 0.5 | <1 | 8 |
| | 0 | 1 | <1 | 23 |
| | 0.25 | 1 | <1 | 28 |

*Hydrogel used in the applicative test below

Conclusion

The results of table IV clearly show that the process according to invention allows to reach improved swelling ratio of the obtained polymer gels, compared with processes that do not comprise a step of treating the polymer gel with a solution of bicarbonate. In addition, when a first reaction of the polymer with monoanhydride is performed, the results are further improved.

II— Applicative Tests in Agriculture a) Preparation of the Samples

In a green house, 3 tests are prepared:
1. One with the hydrogel marked with a * in the above examples (table IV)
2. A second one with a commercial hydrogel based on potassium polyacrylate
3. And a third one being a blank sample without hydrogel Three 10 L pots, are fulfilled with soil and 8 g of hydrogel (when applicable) and 2 L of water are introduced 7 hours before transplanting a melon plant (*Cucumis melo* L.)

b) Irrigation

Each pot was irrigated with a drip. Each pot was fed with the same solution of nutrients (for 1.000 L of solution): 170 g de monopotassium phosphate, 800 g of calcium nitrate; 300 g of potassium nitrate; 120 g de potassium sulfate, 250 g de magnesium sulfate and 30 g of Ferromix®.

The frequency of the irrigations were the following:
0-6 days, each day
7-15 days, each 2 days
16-24 days, each day
25-32 days, twice a day
33-picking, 3 times a day.

Volumes of water were chosen in order to maintain a drainage % of 10% and an electric conductivity in the drainage below 4.0 dS m-1.

c) Evaluation

The water productivity (kg/m3) was calculated with the relationship between the production of fruit (weight of fruit by plant) and the water consumption by plant (m3). The water consumption by plant was calculated as a difference between the volume of water applied and drained, considering a fraction of drainage of 10% for the salinity control.

Both data (water productivity and water consumption) were statistically testes (Tukey—level of 5% of probability).

d) Results

The results of the tests are presented below in Table V

TABLE V

| | Test 1 (invention) | Test 2 (polyacrylate) | Test 3 (blank - no gel) |
|---|---|---|---|
| Water consumption (m3/plant) | 99 | 101 | 104 |
| Reduction of water (versus blank) | 5% | 3% | — |
| Water productivity (kg fruit/m3 water) | 16.2 | 17.3 | 15.2 | e) Conclusion

The invention (test 1) is at least at the same level of performance as the commercial polyacrylate product (test 2) with:
- the invention (test1) and commercial product (test2) leading to water reduction that it's statistical different from situation without gel. No statistical difference between Solvay and commercial product.
- The invention material is biodegradable
- There's no statistical difference at any other characteristic between the invention (test1) and commercial product (test2).

The invention claimed is:

1. A method for preparing a polymer gel, the method comprising the steps of:
   (a0) adding a cyclic monoanhydride to a solution comprising a polymer comprising hydroxyl groups, in the presence of a catalyst,
      wherein the polymer comprising hydroxyl groups is cellulose acetate with a degree of substitution of OH groups between 1.3 and 3; and
      wherein the cyclic monoanhydride is phthalic anhydride or 1,2,4-benzenetricarboxylic anhydride;
   (a) adding a cyclic dianhydride to the solution comprising the polymer comprising hydroxyl groups in the presence of the catalyst, thereby forming a solution including hydrophilic polymer,
      wherein the molar ratio of dianhydride per hydroxyl group of the polymer in the solution of step (a) is about from 0.1 to 2.0 mol/mol; and
      wherein the molar ratio of monoanhydride per hydroxyl group of the polymer in the solution of step (a0) is about from 0.1 to 1 mol/mol;
   (b) maintaining the solution including hydrophilic polymer of step (a) under conditions suitable for crosslinking of the hydrophilic polymer by the cyclic dianhydride, thereby forming a polymer gel; and
   (c) treating the polymer gel with an aqueous solution of bicarbonate.

2. The method according to claim 1, wherein the cyclic dianhydride is selected from the group consisting of pyromellitic dianhydride (PMDA), ethylenediaminetetraacetic dianhydride (EDTA), diethylenetriaminepentaacetic dianhydride (DTPA), 3,3',4,4' bisphenyltetracarboxylic dianhydride (BPDA), pyromelitic diimide (PyDi), benzophenone-3,3',4,4'-tetracarboxylicdianhydride and mixtures thereof.

3. The method according to claim 1, wherein the cyclic monoanhydride is phthalic anhydride.

4. The method according to claim 1, further comprising a step (d) of drying the polymer gel of step (c).

5. A polymer gel produced by the method of claim 1.

6. The polymer hydrogel according to claim 5, wherein said polymer gel has a swelling ratio according to ASTM JIS K 7223—tea bag method, of at least about 10.

7. An article of manufacture comprising a polymer gel according to claim 5, wherein said article of manufacture is selected from the group consisting of devices the controlled release of water, nutrients or phytochemicals in agriculture, devices for environmental remediation, absorbent products for personal and household hygiene, toys and devices adapted to altering their size when brought into contact with water or aqueous solutions.

8. A method for preparing a polymer gel, the method comprising the steps of:
(a0) adding a cyclic monoanhydride to a solution comprising a polymer comprising hydroxyl groups, in the presence of a catalyst,
   wherein the polymer comprising hydroxyl groups is cellulose diacetate, cellulose triacetate, or a mixture thereof, or cellulose dipropionate, cellulose tripropionate or a mixture thereof, or respective mixtures thereof; and
   wherein the cyclic monoanhydride is phthalic anhydride;
(a) adding a cyclic dianhydride to the solution comprising the polymer comprising hydroxyl groups in the presence of the catalyst, thereby forming a solution including hydrophilic polymer;
   wherein the molar ratio of dianhydride per hydroxyl group of the polymer in the solution of step (a) is about from 0.5 to 1.5 mol/mol; and
   wherein the molar ratio of monoanhydride per hydroxyl group of the polymer in the solution of step (a0) is about from 0.1 to 1 mol/mol;
(b) maintaining the solution including hydrophilic polymer of step (a) under conditions suitable for cross-linking of the hydrophilic polymer by the cyclic dianhydride, thereby forming a polymer gel; and
(c) treating the polymer gel with an aqueous solution of bicarbonate.

* * * * *